United States Patent [19]
Rumbold et al.

[11] 3,804,642
[45] Apr. 16, 1974

[54] EXOTHERMIC ANTIPIPING COMPOSITIONS

[75] Inventors: Bernhard Carl Rumbold; John Edward Cartwright, both of Birmingham, England

[73] Assignee: Foseco International Limited, Birmingham, England

[22] Filed: Feb. 20, 1973

[21] Appl. No.: 334,016

Related U.S. Application Data
[63] Continuation of Ser. No. 92,158, Nov. 23, 1970, abandoned.

[52] U.S. Cl............ 106/38.27, 106/38.28, 106/38.9, 106/56, 164/53, 249/202
[51] Int. Cl................................................. B28b 7/36
[58] Field of Search........... 106/38.27, 38.28, 38.22, 106/38.9, 56; 164/53; 249/202; 264/29

[56] References Cited
UNITED STATES PATENTS
3,308,514  3/1967  Osborn et al. .................. 164/41
3,340,082  9/1967  Meyer et al. .................... 106/38.22

*Primary Examiner*—Lorenzo B. Hayes
*Attorney, Agent, or Firm*—Wolfe, Hubbard, Leydig, Voit and Osann, Ltd.

[57] ABSTRACT

Exothermic antipiping compositions comprising particulate heat insulating refractory material, 1 – 50 percent by weight of acid treated graphite and 10 – 50 percent by weight of an exothermic component.

5 Claims, No Drawings

EXOTHERMIC ANTIPIPING COMPOSITIONS

This is a continuation of application Ser. No. 92,158, filed Nov. 23, 1970, now abandoned.

This invention relates to exothermic antipiping compositions.

In the casting of molten metal to form ingots or castings, it is common practice to provide a barrier to loss of heat from the topmost portions of the body of molten metal just after casting; in this way the head metal is kept molten and feed of metal to the body of the ingot or casting, to compensate for the shrinkage on solidification, is maintained. The barrier to the loss of heat is often accomplished by placing on the exposed molten metal surface a layer of exothermic composition, i.e., a composition which on being placed on the surface ignites to heat itself up (and thus counteract the chilling effect of placing a layer of cold material on the metal surface) and burns to leave a layer of a heat-insulating residue. Since such a layer minimises the formation of pipe, the materials used are referred to simply as exothermic antipiping compositions, and this term will be used herein for simplicity of expression.

According to a first feature of the present invention there is provided an exothermic antipiping composition which comprises a refractory, heat insulating material, an exothermic component and acid treated graphite. The exothermic component is preferably a mixture of an oxidisable metal (e.g., aluminium, magnesium, silicon, ferrosilicon, calcium silicide) and an oxidising agent therefor (e.g., alkali metal nitrates or chlorates, iron oxide, ammonium perchlorate), though in some cases the exothermic component may consist merely of a finely divided easily oxidisable material such as aluminium. In this latter case, the oxidisable material preferably constitutes 10 – 50 percent by weight of the antipiping composition. Preferably the proportion of acid treated graphite in the antipiping composition is in the range of 1 – 50 percent by weight, most preferably 3 – 20 percent by weight.

It is found that in using the antipiping compositions of this invention, the compositions ignite and expand to give a thick heat-insulative burnt-out coherent layer which acts to reduce the heat lost from the surface of the ingot or casting.

Acid treated graphite is a general term to describe flake graphites the particles of which on heating, intumesce to give a low density highly heat insulative vermicular structure. These graphites may be prepared by treating graphite with mixtures of sulphuric acid with nitric acid, or perchloric acid and then removing the so treated graphite from the acid. The acid mixture may contain an inorganic oxidising agent such as chromium trioxide, potassium chlorate or potassium permanganate. The so treated graphite will, on heating, usually to temperatures in excess of 150° C, expand to many times its original volume, greater degrees of reaction between graphite and acid during the treatment process giving greater expansion figures.

The refractory heat insulating material may be, for example, a refractory filler such as grog, silica flour, alumina, bauxite, magnesia, clays such as ball clay or china clay or any suitable refractory silicate; light weight fillers such as vermiculite, perlite and pumice may also be used. Carbonaceous materials may also be used. The grain size of such material is preferably such that it does not segregate from the mixture and such that the mixture can be pelletized, granulated or tabletted as required. The refractory heat insulating material may constitute 10 to 70 percent by weight of the composition.

Where the composition contains finely divided aluminium as the exothermic component, or part of it, the composition may also advantageously contain a fluoride, known per se for its use in controlling the energy of aluminothermic reactions.

The antipiping compositions defined above are preferably in powder form, but may be granulated or formed into tablets; a small proportion of a clay or other binder may be included in the composition to aid pelletisation.

It is found that the antipiping compositions of the invention are of particular value in the casting of molten metals, particularly ferrous metals.

According, therefore, to a further feature of the invention there is provided a method of casting molten metal to form an ingot or casting wherein, after the molten metal has been poured into a mould, there is applied to the surface of the molten metal in the feeder head an exothermic antipiping composition as defined above. The amount of antipiping composition applied is preferably sufficient to give a layer of expanded material at least 25 mm. thick on the top of the molten metal.

It is found that, contrary to expectation, results obtained by the use as antipiping compound of acid treated graphite alone are unsatisfactory. The high concentration of carbonaceous material tends to affect the carbon content of the metal being cast, and this is disadvantageous, especially when the metal is ferrous Additionally, there is a tendency for the expanded carbon, which is of extremely low apparent density, to blow away from the metal surface, for example under the influence of draughts, thus minimising its efficiency as a heat-insulative layer and presenting an air pollution problem. There is a tendency for oxidation of the carbon in contact with the air in finely divided form, and it is difficult accurately to apply a small dosage of unexpanded acid treated graphite to give just the desired thickness of expanded layer. It is found in practice that acid treated graphite used alone expands to an excessive layer thickness and this is a serious disadvantage since it results in overspill and waste. The incorporation of refractory heat insulating material and exothermic component overcomes all these disadvantages.

The antipiping compositions of the present invention are suitable for both foundry and steelworks use; they can be used on a wide variety of metals both ferrous and non-ferrous (e.g., copper).

The following specific example will serve to illustrate the invention:

EXAMPLE

| 400 | grams of a mixture comprising |
|---|---|
| 30% | aluminium (−100 mesh B.S.S.) |
| 12% | acid treated graphite |
| 6% | wood flour |
| 4% | expanded perlite |
| 2% | sodium fluoride |
| 46% | alumina | were placed on a 23 cm square hot plate maintained at 1,420° C. The mixture ignited after 30 seconds thus minimising chill, expanded and formed a layer 50 mm thick on the plate. The rate of heat loss after 14 minutes was found to be two thirds of that obtained using 1,000 grams of a conventional proprietary exothermic antipiping composition in an identical fashion. After 40 minutes the total heat lost was half that lost when using the conventional proprietary exothermic antipiping composition.

Trials made at four steelworks have shown that there is an average increase in yield of about 1 percent of sound metal in ingots of 1½ to 20 tons, using an exothermic antipiping compound as defined in the foregoing example, at a rate of two thirds the quantity by weight, of a conventional commercially available antipiping compound.

The antipiping compositions of this invention have a wide variety of commendable qualities; they are clean and produce little dust in use, they are relatively economic to manufacture and use, and can easily be formed into easily handleable tablets, pellets or granules.

Carbon pick-up by the molten metal is negligible, and there is only a low contact area of the antipiping composition with the molten metal.

It is possible to obtain satisfactory results even where the molten metal is subject to turbulence (e.g., jolting of an ingot mold in a train of such moulds) by incorporating in the antipiping composition a material which will tend to sinter of melt at the molten metal temperature, and so bind the layer to a more coherent form.

Suitable materials are expanded perlite, expanded vermiculite, fly ash and pumice.

We claim as our invention:

1. In an exothermic composition comprised of at least one particulate refractory heat-insulating material selected from the group consisting of vermiculite, perlite, pumice, grog, silica flour, alumina, bauxite, magnesia, clays and other refractory silicates, and about 10–50 percent by weight of an exothermic component, the improvement wherein said composition contains about 1–50 percent by weight of acid-treated graphite which on heating intumesces to give a low density highly insulative vermicular structure, said composition yielding a heat-insulative layer when placed on the exposed surface of molten metal in combination with a minimization of carbon pick-up by the metal and dust generation.

2. An exothermic composition according to claim 1 wherein the exothermic component is a finely divided easily oxidisable material.

3. An exothermic composition according to claim 2 wherein the oxidisable material is aluminum.

4. An exothermic composition according to claim 1 wherein the exothermic component is a mixture of an oxidisable metal and an oxidising agent therefor.

5. An exothermic composition according to claim 1 which comprises 3–20 percent by weight acid treated graphite.

* * * * *